(12) United States Patent
Gombert

(10) Patent No.: US 6,494,412 B2
(45) Date of Patent: Dec. 17, 2002

(54) DEVICE FOR HOLDING AND/OR ATTACHING FLAT OBJECTS

(75) Inventor: Stephane Gombert, Grenoble (FR)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/976,130

(22) Filed: Oct. 11, 2001

(65) Prior Publication Data

US 2002/0074461 A1 Jun. 20, 2002

(30) Foreign Application Priority Data

Oct. 14, 2000 (DE) ........................................ 100 51 120

(51) Int. Cl.$^7$ ................................................. F16L 3/00
(52) U.S. Cl. .................... 248/65; 248/49; 248/74.1; 248/74.2; 24/297; 24/543
(58) Field of Search ......................... 248/49, 56, 68.1, 248/73, 74.2, 74.4; 24/543, 297, 115 H

(56) References Cited

U.S. PATENT DOCUMENTS

| | | | | |
|---|---|---|---|---|
| 4,325,526 A | * | 4/1982 | Kitagawa | 248/73 |
| 4,356,599 A | * | 11/1982 | Larson et al. | 24/16 PB |
| 4,457,482 A | * | 7/1984 | Kitagawa | 248/74.3 |
| 4,635,886 A | * | 1/1987 | Santucci et al. | 248/73 |
| 4,656,697 A | * | 4/1987 | Naslund | 24/30.5 P |
| 5,201,484 A | * | 4/1993 | Thoen | 248/68.1 |
| 5,202,172 A | * | 4/1993 | Graf | 428/100 |
| 5,339,500 A | * | 8/1994 | Muller et al. | 24/514 |
| 5,353,571 A | * | 10/1994 | Berdan et al. | 52/716.5 |
| 5,535,969 A | * | 7/1996 | Duffy, Jr. | 248/68.1 |
| 5,960,522 A | * | 10/1999 | Boe | 24/543 |
| 6,061,882 A | * | 5/2000 | Otte-Wiese | 24/487 |
| 6,164,603 A | * | 12/2000 | Kawai | 248/73 |
| 6,174,006 B1 | * | 1/2001 | Burt | 292/307 A |

FOREIGN PATENT DOCUMENTS

| | | |
|---|---|---|
| JP | 11122759 A | 10/1997 |
| JP | 11346423 A | 6/1998 |

* cited by examiner

Primary Examiner—Anita King
Assistant Examiner—Steven Marsh
(74) Attorney, Agent, or Firm—Gifford, Krass, Groh, Sprinkle, Anderson & Citkowski, P.C.

(57) ABSTRACT

A device is provided for securing a flat object to a carrier plate. The device includes a base plate with a pair of spaced apart end sections, and a middle section extending between the end sections. A pair of upwardly protruding extensions each has a lower end attached to the middle section of the base, and an upper end spaced therefrom. The extensions are spaced apart by a distance and are elastic such that the upper ends may be pushed apart. A bridge extends between the upper ends of the extension. The bridge has a pair of spaced apart ends interconnected with the upper ends of the extension and a midportion therebetween. The bridge has a total length greater than the length the distance between the extensions. The bridge has a disengaged position wherein the midportion is spaced from the middle section of the base plate and the upper ends of the extension are not pushed apart. The bridge also has an engaged position wherein the midportion of the bridge is pushed downwardly towards the middle section of the base plate and the upper ends of the extensions are pushed apart. A locking device is provided for locking the bridge in the engaged position.

19 Claims, 1 Drawing Sheet

DEVICE FOR HOLDING AND/OR ATTACHING FLAT OBJECTS

FIELD OF THE INVENTION

The present invention pertains to a device for holding and/or attaching flat objects to a carrier plate and, in particular for attaching ribbon cables to a carrier plate.

BACKGROUND OF THE INVENTION

Ribbon cables have a number of conductors with terminals arranged next to each other in a plane. Ribbon cables may be mounted on a thin, electrically insulating carrier layer. They can be set in a manner that saves a lot of space on carrier plates, e.g., on chassis parts of vehicles, on certain, predetermined tracks. Thus, they must be attached at intervals to the carrier plate.

A device is known from French Patent No. 1,593,626, which is meant for holding a flat object, and also for its attachment to a carrier. The device comprises a base plate, on which two L-shaped arms are symmetrically fixed at a distance from each other. The projecting ends of the arms are connected by a three-part bridge, wherein the total length of the bridge is greater than the distance between the two arms. The interconnection portions of the three plate-shaped parts of the bridge are designed to act like hinges relative to each other and also relative to the arm ends, so that the bridge parts can pivot about these interconnections relative to each other and to the arms. The device can assume an open and a closed position. In the open position, the side parts of the bridge form an obtuse angle with the L-shaped arms, and with the side parts and the middle part of the bridge arch over the base plate like a roof. In the closed position, the side parts of the bridge form an acute angle with the L-shaped arms, and the middle part of the bridge contacts the base plate tightly. Means for attaching to a carrier can be provided on the base plate. A flat object can be clamped between the base plate and the middle part of the bridge by setting the object on the base plate with the device in its open state. Then pressure is applied to the articulated parts of the bridge such that the middle part of the bridge is brought into contact with the flat object.

In the French Patent, the device is described for use as a hose bracket. The device in the French Patent is not optimal for the preferred use of the present invention, namely the attachment of ribbon cables to a carrier plate, and in particular to the chassis parts of vehicles. The device can spontaneously open due to, e.g., vibrations or material fatigue, so that the attachment or hold can be unexpectedly released. This is particularly disadvantageous if the device is mounted in a position that is difficult to access or that is practically inaccessible after manufacture of the vehicle, as is normally the case. In addition, through the planar contact of the middle part of the bridge on the base plate or on the interposed object, the contact pressure and thus the reliability of the hold is reduced. In addition, the briefly mentioned use of a screw in the middle of the base plate to attach the device to a carrier is unsatisfactory. The screw interferes with the object to be attached, and in the case of a ribbon cable, it can lead to damage.

SUMMARY OF THE INVENTION

The present invention provides a device that permits a long-lasting, reliable hold and attachment, in particular of ribbon cables, to a carrier plate. Spontaneous loosening of the device is not possible. The device can be attached and closed and opened again easily and quickly with little handling and has no parts that could be lost. Damage to the ribbon cable is precluded.

According to the present invention, a base plate has two end sections for attaching to the carrier plate and a middle section that can be brought into contact with the carrier plate or a flat object to be attached to the carrier plate. A snap-in means is provided at the middle part of the bridge. The snap-in means projects downwards and engages a locking hole in the base plate. The snap-in means is preferably snap-in hooks that project downwards. The snap-in means engages the locking hole such that the device is reliably held in its closed position, and a spontaneous disengagement from this position is not possible. The side arrangement of the attachment means precludes damage to the ribbon cable or another flat object.

Support strips that project downwards at an angle are formed at the longitudinal sides of the middle section of the base plate. The longitudinal edges of these support strips extend beyond the bottom edge of the middle section of the base plate. The support strips reduce the contact surface of the device on a ribbon cable or some other flat object to be attached to the carrier plate, so that the contact pressure between the device and the carrier plate is increased, and thus the hold is more reliable.

Preferably, there is a central hump in the middle section of the base plate. The locking hole for the snap-in hooks that project downwards from the middle part of the bridge passes through this hump. The hump can be formed by a central bulge on the top side and a corresponding depression in the bottom side of the middle section of the base plate.

In the middle of each side support strip, there is a slot extending in the longitudinal direction, and the lower opening of the locking hole can be accessed with a tool through this slot. Thus, when required, the snap-in hooks can be disengaged from the locking hole, the ribbon cable can be detached, and the device remains undamaged, and thus, reusable.

Preferably there is a through hole in each of the two end sections of the base plate for attaching the device to the carrier plate. The diameter of and distance between the through holes correspond to the diameter of and the distance between two posts on the carrier plate, and the device is pressed onto these posts for attaching to the carrier plate with these through holes.

These posts on the carrier plate preferably have grooves and/or ribs. Extensions project from the base plate and the ends of the extensions have pointed and angled outer edges that project into the region of the through holes. By pressing the middle part of the bridge down, the extensions are pushed apart and the outer edges of the extensions contact the grooves and/or ribs of the posts, which additionally secures the attachment.

BRIEF DESCRIPTION OF THE DRAWINGS

The invention is described in more detail in the following with reference to the attached drawings as an example.

DETAILED DESCRIPTION OF THE PREFERRED EMBODIMENTS

Figure 1:
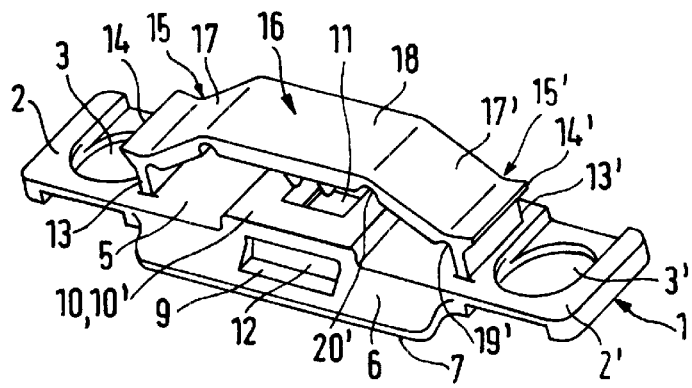
FIG. 1 is a perspective view of the device according to the present invention.
Figure 2:
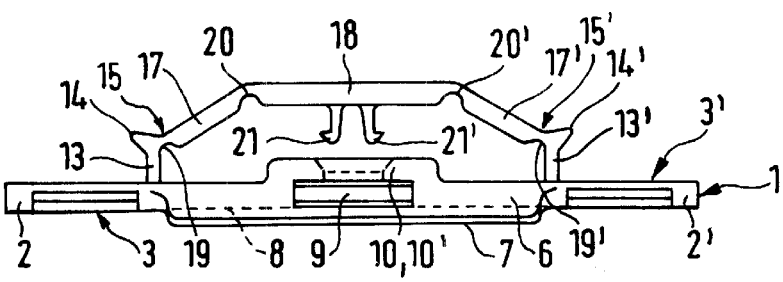
FIG. 2 is an elevational view of the longitudinal side of the device according to FIG. 1.
Figure 3:
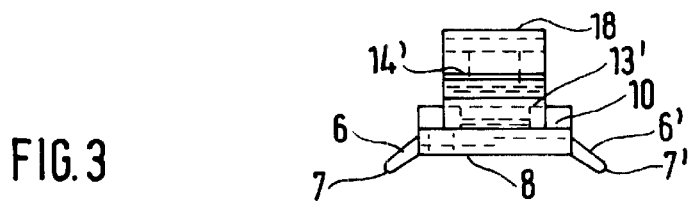
FIG. 3 is an end view of the device according to FIG. 1.
Figure 4:
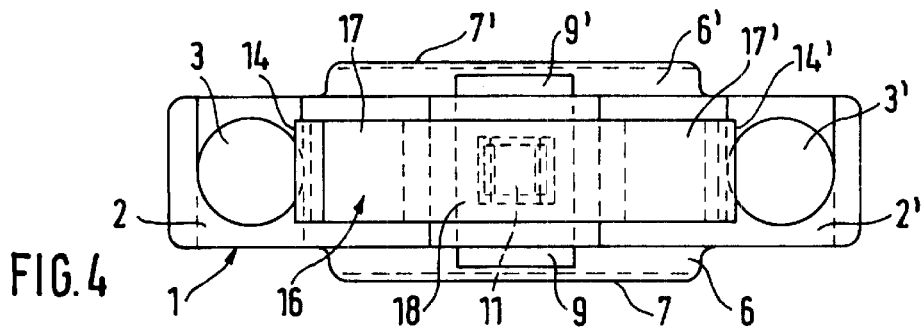
FIG. 4 is a top view of the device according to FIG. 1.
Figure 5:
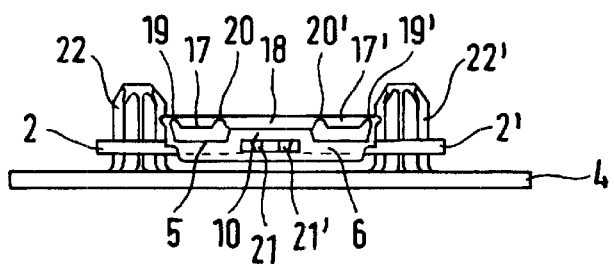
FIG. 5 is a side elevational view of the device similar to FIG. 2 with the device completely assembled and tightened on a carrier plate.

Referring to FIGS. 1–5, the device according to the present invention comprises a rectangular, longitudinal base plate 1 that features a through hole 3, 3' for attaching to a carrier plate 4 in each of its two end sections 2, 2' (see FIG. 5). Support strips 6, 6' extend downwards at an angle from the longitudinal sides of the middle section 5 of the base plate 1 between the two through holes 3, 3'. The free longitudinal edges 7 of these support strips 6, 6' project to a certain degree beyond the bottom edge 8 of the base plate 1 (See FIG. 3). At the center of each of the two support strips 6, 6' a slot 9, 9' is defined generally perpendicular to the strips 6, 6'. On the top side of the middle section 5 of the base plate 1 there is an upwardly extending hump 10, which has a locking hole 11 in its middle. The hump 10 can be formed, e.g., by a central bulge 10' on the top side of the middle section 5. A corresponding upwardly extending depression 12 may be formed in the under side of the middle section. The opening of the locking hole 11 on the under side of the hump 10 (in the depression 12) can be accessed by an instrument or tool through the slots 9, 9' in the two support strips 6, 6'.

At the transition between each end section 2, 2' and the middle section 5 of the base plate 1, a perpendicular upwardly extending extension 13, 13' is formed on the top side of the base plate 1. Both extensions 13, 13' have at their upper ends a pointed outer edge 14, 14' that extends to a certain degree over the through holes 3, 3' of the base plate 1. The extensions 13, 13' are connected to each other by a bridge 16 that arches over the middle section 5 of the base plate 1. This bridge 16 comprises two side parts 17, 17' and a middle part 18 that are connected hinge-like to each other. Each of the side parts 17, 17' have one end that is connected hinge-like to the upper ends 15, 15' of one of the extensions 13, 13', respectively. All parts 17, 17', 18 of the bridge are plate shaped and the hinges 19, 19' and 20, 20' can be formed as so-called film hinges by reduction of material at the transitions. The middle part 18 of the bridge 16 runs parallel to the base plate 1. The side parts 17, 17' are in a mirror arrangement and are at an angle between the middle part 18 and the two extensions 13, 13'. Two snap-in hooks 21, 21' are formed on the bottom side of the middle part 18 of the bridge and extend downwardly from the middle part. The hooks 21, 21' are mirror-images and project away from each other.

In order to be able to attach a flat object, e.g., a ribbon cable, to a carrier plate 4 with the device described above, two posts 22, 22' are mounted on this carrier plate 4 at the attachment points (see FIG. 5). The posts 22, 22' are positioned at a distance from each other that corresponds to the distance between the two through holes 3, 3' in the end sections 2, 2' of the base plate 1. Around their circumference, the posts 22, 22' have ribs or grooves. The flat object to be attached, preferably a ribbon cable, is initially set between the two posts 22, 22' and on the carrier plate 4. Then the device described above is pressed onto the posts 22, 22' such that its side through holes 3, 3' engage the posts 22, 22'. The device if pressed onto the posts 22, 22' until the support strips 6, 6' finally press tightly against the ribbon cable on the carrier plate 4, wherein the extensions 13, 13' are initially bent back easily and elastically at their outer edges 14, 14'. Subsequently, the middle part 18 of the bridge 16 is pressed downwards, so that the snap-in hooks 21, 21' projecting downwards from the bridge engage and lock in the locking hole 11 in the hump 10 in the middle section 5 of the base plate 1. Because the total length of the bridge 16 is greater than the distance between the two extensions 13, 13', these extensions are pressed outwards, so that their pointed outer edges 14, 14' press against the posts 22, 22' and contact their ribs or grooves. The ribbon cable is now pressed and fixed tightly by the support strips 6, 6' against the carrier plate 4, wherein the contact pressure is increased due to the small footprint of the support strips 6, 6' relative to the known device. Due to the engagement of the snap-in hooks 21, 21' in the locking hole 11 and the outer edges 14, 14' to the posts 22, 22', the device is double-locked and held securely in this position, so that spontaneous disengagement from this position is not possible.

If it is necessary to disengage the ribbon cable or another flat object from this attachment, the snap-in hooks 21, 21' can be disengaged from their engagement in the locking hole 11 by a tool extending through one of the slots 9, 9' in the support strips 6, 6'. Then, the bridge 16 can again assume its position arching over the middle section 5 of the base plate 1, and the device can be lifted upwards. In this way, the device remains undamaged and intact, and it can be used again without any additional means. Due to the locking attachment of the snap-in hooks 21, 21' in the locking hole 11, the reliable holding of the ribbon cable or another flat object is guaranteed, even for multiple reuses of the device, and in spite of potential material fatigue.

I claim:

1. Device for holding and/or attaching flat objects to a carrier plate, the device having a base plate from which two extensions, that can be pushed apart elastically and that are separated from each other by a distance, project perpendicularly to the base plate, the ends of the extensions being connected by a three-part bridge having a total length greater than the distance between the two extensions, the bridge having three parts that are connected to each other and to the ends of the extensions in a hinge-like manner, such that the device can assume a disengaged position, in which the three-part bridge arches over the base plate like a roof, and a closed position, in which the middle part of the bridge contacts the base plate, characterized in that:

the base plate comprises two end sections for attaching to the carrier plate and a middle section that can be brought into contact with the carrier plate, the middle part of the bridge having snap-in means that project downwards and that can engage a locking hole in the base plate.

2. The device according to claim 1, further comprising support strips formed on the longitudinal side of the middle section of the base plate, the support strips projecting downwards at an angle and having longitudinal edges, the longitudinal edges of the support strips extending beyond the bottom edge of the middle section of the base plate.

3. The device according to claim 1, further comprising a hump formed in the middle section of the base plate, the locking hole for the snap-in hooks which project downwards from the middle part of the bridge being defined through this hump.

4. The device according to claim 2, wherein a slot is defined in the middle of each of the side support strips, the slots extending in the longitudinal direction, and the lower opening of the locking hole being accessible by a tool through these slots.

5. The device according to claim 3, wherein the hump is formed by a central bulge on the top side of the middle section of the base plate and a corresponding depression in the under side of the middle section of the base plate.

6. The device according to claim 1, wherein each of the two end sections of the base plate has a through hole defined therethrough, the diameter and distance between the holes corresponding to the diameter of and distance between two posts on the carrier plate, the device being attached to the carrier plate with these through holes being pressed onto these posts.

7. The device according to claim 6, wherein the posts on the carrier plate have grooves or ribs, and the extensions projecting from the base plate have pointed and angled outer edges that project into the region of the through holes, such that when the extensions are pushed apart when the middle part of the bridge is pressed down, the outer edges of the extensions can contact the grooves and/or ribs of the posts.

8. A device for securing a flat object to a carrier plate, the device comprising:
- a base plate having a pair of spaced apart end sections and a middle section extending therebetween;
- pair of upwardly protruding extensions each having a lower end attached to the middle section of the base plate and an upper end spaced therefrom, the extensions being spaced apart by a distance and being elastic such that the upper ends may be pushed apart;
- a bridge extending between the upper ends of the extensions, the bridge having a pair of spaced apart ends interconnected with the upper ends of the extensions and a midportion therebetween, the bridge having a total length greater than the distance between the extensions, the bridge having a disengaged position wherein the midportion is spaced from the middle section of the base plate and the upper ends of the extensions are not pushed apart, the bridge further having a engaged position wherein the midportion of the bridge is pushed downwardly towards the middle section of the base plate and the upper ends of the extensions are pushed apart; and
- a locking device for locking the bridge in the engaged position.

9. The device according the claim 8, wherein the bridge comprises three sections that are interconnected by hinge-like connections.

10. The device according to claim 8, wherein the middle section of the base plate has a locking hole defined therein, the locking device comprising a locking member formed on the under side of the midportion of the bridge, the locking member configured to engage the locking hole.

11. The device according to claim 10, wherein the locking member comprises a pair of snap-in hooks extending downwardly from the midportion of the bridge.

12. The device according to claim 10, wherein the middle portion of the base plate has a hump formed thereon, the hump being formed by a central bulge on the top side of the middle section of the base plate and a corresponding depression formed in the under side of the middle section of the base plate, the locking hole being defined through the hump.

13. The device according to claim 10, wherein the middle section of the base plate has a pair of longitudinal sides and the locking hole has a lower opening, the device further comprising support strips formed on the longitudinal sides of the middle section, each strip projecting downwards at an angle to a longitudinal edge, the longitudinal edges being lower than the under side of the middle section of the base plate, a slot being defined in each of the side strips such that the lower opening of the locking hole is accessible by a tool through the slots.

14. The device according to claim 8, wherein the end sections of the base plate each have a through hole defined therethrough, the holes having a diameter and being spaced apart by a distance corresponding to the diameter and distance between two posts extending from the carrier plate, the device being attached to the carrier plate by the through holes being pressed onto the posts.

15. The device according to claim 14, wherein the upper ends of the extensions each have pointed and angled outer edges that project into a region above the through holes such that when the device is pressed onto the posts and the bridge is in the engaged position and the upper ends are pushed apart, the outer edges press engage the posts.

16. A device for securing a flat object to a carrier plate of the type having a pair of spaced apart upwardly extending posts, the device comprising:
- a base plate having a pair of spaced apart end sections and a middle section extending therebetween, each of the end sections having a through hole defined therethrough and the middle section having a locking hole defined therein;
- a pair of upwardly protruding extensions each having a lower end attached to the middle section of the base plate and an upper end spaced therefrom, the extensions being spaced apart by a distance and being elastic such that the upper ends may be pushed apart, the upper ends of each of the extensions having an outer edge;
- a bridge extending between the upper ends of the extensions, the bridge having a pair of spaced apart end members interconnected with the upper ends of the extensions by hinge-like connections and a midportion member extending between the end members and connected thereto by hinge-like connections, the bridge having a total length greater than the distance between the extensions, the bridge having a disengaged position wherein the midportion member is spaced from the middle section of the base plate and the upper ends of the extensions are not pushed apart, the bridge further having a engaged position wherein the midportion member of the bridge is pushed downwardly into contract with the middle section of the base plate and the upper ends of the extensions are pushed apart; and
- a locking device for locking the bridge in the engaged position, the locking device comprising a pair of snap-in hooks extending downwardly from the midportion member of the bridge, the hooks configured to engage the locking hole in the base plate.

17. The device according to claim 16, wherein the middle portion of the base plate has a hump formed thereon, the hump being formed by a central bulge on the top side of the middle section of the base plate and a corresponding depression formed in the under side of the middle section of the base plate, the locking hole being defined through the hump.

18. The device according to claim 16, wherein the middle section of the base plate has a pair of longitudinal sides and the locking hole has a lower opening, the device further comprising support strips formed on the longitudinal sides of the middle section, each strip projecting downwards at an angle to a longitudinal edge, the longitudinal edges being lower than the under side of the middle section of the base plate, a slot being defined in each of the side strips such that the lower opening of the locking hole is accessible by a tool through the slots.

19. The device according to claim 16, wherein the outer edges of the upper ends of the extensions are pointed and angled and project into a region above the through holes such that when the device is pressed onto the posts and the bridge is in the engaged position and the upper ends are pushed apart, the outer edges press engage the posts.

* * * * *